March 13, 1951     H. S. LIBER     2,544,844
CASE FOR MICROFILMS

Filed Aug. 5, 1947     2 Sheets-Sheet 1

Inventor
Henri Sosthene Liber
By Flocks and Simon
Attorneys

March 13, 1951         H. S. LIBER         2,544,844

CASE FOR MICROFILMS

Filed Aug. 5, 1947         2 Sheets-Sheet 2

INVENTOR
Henri Sosthene Liber
BY Flocks and Simon
ATTORNEYS

Patented Mar. 13, 1951

2,544,844

UNITED STATES PATENT OFFICE 2,544,844

CASE FOR MICROFILMS

Henri Sosthène Liber, Paris, France, assignor, by mesne assignments, to Société Civile d'Etudes & Inventions Liber (S. E. I. L. I. B.), Paris, France, a corporate body of France Application August 5, 1947, Serial No. 766,133
In France July 21, 1947

2 Claims. (Cl. 40—16)

Microfilms, the use of which is now becoming more general, are usually made in the shape of sections of film comprising a number of microfilm pictures. When it is desired to ascertain what is on a microfilm, it is passed through a reading apparatus which projects the images on to a screen and enlarges them.

As is known, the emulsion of such microfilms is extremely fragile and it has already been proposed to protect it by various means such as a coating or a varnish, the application of which comprises however, a major and expensive operation. Furthermore, it has been observed during the manipulations of the microfilm and while same is being passed through the reading apparatus, that the support of the emulsion itself was frequently damaged (scratches, embedding of particles, etc.) so that after a short time the microfilm becomes useless.

Another drawback of the microfilms such as they are used at present consists in the difficulties of identifying and classifying them. In order to identify them it is necessary to reserve a fraction of the image on which are photographed identification signs shown on a very large scale so that their photograph, on a reduced scale is still legible. This method of procedure complicates the printing of the microfilm and increases its cost of manufacture.

It has also been proposed to construct, for such microfilms, cases of opaque materials which are themselves provided with the identification signs and thereby facilitate the classification, and from which the microfilms are removed each time they are to be read. Such cases have several drawbacks; first of all they do not protect the microfilm from damage due to passing it through the reading apparatus and to manipulating it; then they offer no guarantee as regards classification since the case is frequently separated from its microfilm and a microfilm may be placed by mistake in a case which is not intended for it.

The present invention eliminates all the foregoing drawbacks. It relates, by way of a new industrial product, to a case for microfilms which is characterized by the fact that it is constructed of a transparent material so that the microfilm which is housed therein can be read without having to be removed from its case which to some extent forms a unit with its microfilm and is definitely identified therewith.

Other advantages and particularities of the invention will become apparent in the ensuing detailed description made with reference to the accompanied drawing which shows diagrammatically and merely by way of example one embodiment of a case according to the invention.

Figure 1:
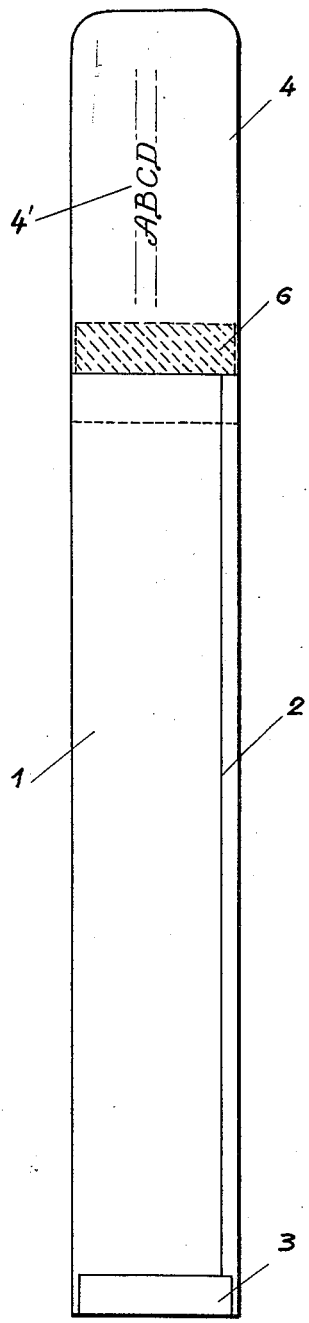
Fig. 1 is an elevational view of said case.

One of the essential characteristics of case I shown in the drawings consists in the fact that it is constructed of a transparent material. Use may preferably be made of "cellophane" since it withstands the action of acids; it is obvious however, that any other material of the same kind may be used.

Figure 2:
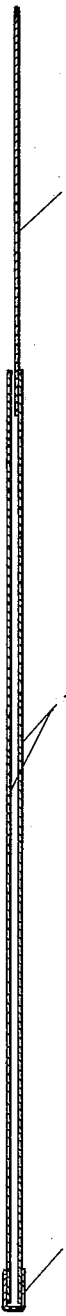
Fig. 2 is the corresponding transverse section.
Figure 3:
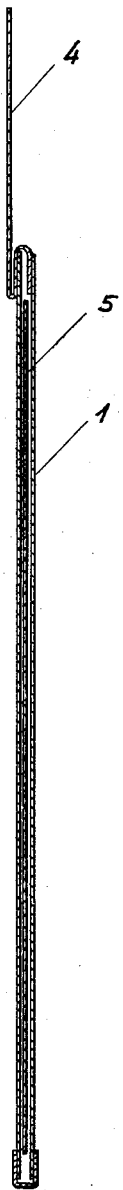
Fig. 3 is a similar section after the microfilm has been inserted and the case closed.

In order to manufacture this case, a tube of "cellophane" may advantageously be constructed by cementing at 2, said tube being then cut into sections whose length corresponds to that of the microfilm. This section of the tube is flattened and then closed at one end by means for example of a piece of paper or bristol board cemented at 3, the other end remaining open, at any rate temporarily. In Figs. 2 and 3 it has been assumed that the bristol board rider 3 was cemented to the outer faces of both sides of the case.

At the open end of the case a flap 4 of any desired length may advantageously be added by cementing and the identification signs 4' of the microfilm 5 may be marked thereon, said microfilm being inserted in the case by the open end thereof.

When the microfilm 5 has thus been placed in position, the case may be finally closed by means of the flap 4 (see Fig. 3), which, for this purpose is provided with a gummed portion 6.

In this manner the microfilm and its case form an inseparable unit, and for reading the microfilm said unit is passed through the reading apparatus as is permitted by the transparency of the case which therefore constantly protects the microfilm from any damage and any soiling.

On the other hand, since the identification signs are marked very distinctly and very legibly on the outside of the case, classification is considerably facilitated and no mistake can occur in said classification since the case is never separated from the microfilm to which it corresponds.

Another advantage offered by the case according to the invention consists in the fact that it enables the direction of insertion in the reading apparatus to be ascertained without having to fumble or search as is necessary with the usual microfilms.

Figure 4:
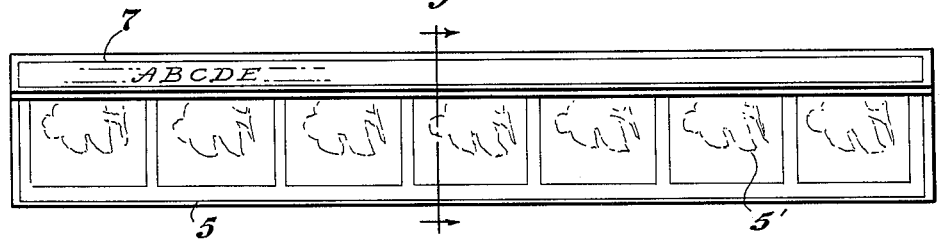
Fig. 4 is an elevational view of another embodiment of said case.
Figure 5:
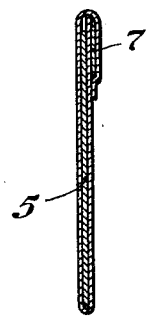
Fig. 5 is a sectional view along the line II—II of Fig. 4 (the thickness being exaggerated for the sake of clarity).

According to the embodiment of Figs. 4 and 5 a thin strip 7 of paper or like material is inserted when cementing between the two edges to be cemented of the strip of transparent material. Said strip 7 is cemented by one of its faces to one of the edges to be cemented, and by its other face to the other edge. It is therefore finally said strip 7 that effects the cementing and the joining of said two edges.

If the signs or indications that identify or relate to the microfilm 5 housed in the case are then marked on the outer face of said case opposite said strip 7 (see the signs A, B, C . . . shown by way of example in Fig. 4), said signs will be very distinctly apparent although they are marked on transparent material, this being owing to the fact that the strip 7 forms a contrasting background.

Naturally the width of said strip should be such that it leaves the whole zone of the case opposite which are located the images 5' of the microfilm 5 completely free.

The cases thus constructed may be classified according to any of the present known methods, and whatever classification is adopted they can be very easily and quickly recognized owing to the fact that the identification signs marked thereon always remain in a very visible position.

According to the classification adopted, the strip 7 and consequently the identification signs may be placed along the upper longitudinal edge or along the lower longitudinal edge.

If for example, the cases are to be classified like vertical cards, the strip 7 will be provided along the upper edge as shown in the drawing.

If on the contrary, the synoptical classification is adopted, since the cases are in that case classified in card indexes with visible cards, the strip 7 will be provided along the lower edge.

Cases are thus obtained according to the invention which, while providing perfect protection and identification of the microfilm, can be classified in extremely satisfactory conditions.

Figure 6:
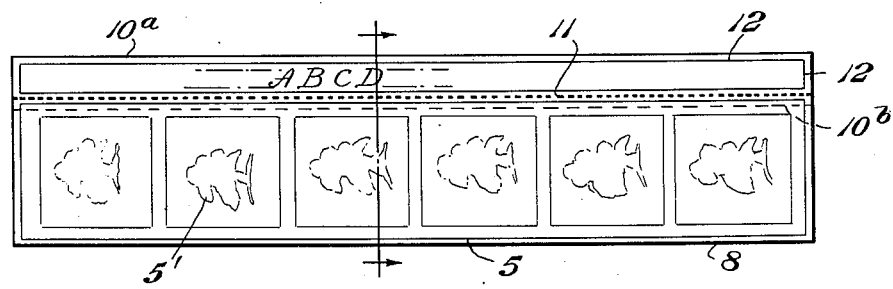
Fig. 6 is an elevational view of another embodiment.
Figure 7:
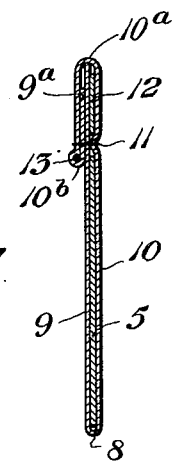
Fig. 7 is a transverse section thereof.

According to the embodiment shown in Figs. 6 and 7, the case is obtained by starting from a strip of transparent material of appropriate length which is folded at 8 to form two parallel faces 9 and 10. Face 10 is made somewhat wider than face 9 and the portion of face 10 extending beyond face 9 is doubly folded as shown at 10a and 10b, each fold extending the length of the case so as to enclose the upper open longitudinal edge of the two faces. The various thicknesses of transparent material are then connected together by means of stitches 11 which extend the entire length of the case. The stitches 11 are located near the fold 10b and form a main compartment in which the microfilm 5 is inserted and an auxiliary compartment in which a thin strip of paper 12 is inserted. The thin strip of paper 12 may bear any desired identification signs such as A, B, C, D . . . which have been marked thereon before insertion into the case.

It will be observed that with this embodiment there is no single free edge of transparent material liable to tear readily; the only accessible edge is the folded edge 10b which is double and consequently very strong; its strength can moreover be increased by inserting in this fold a thread 13 of any suitable material.

I claim:

1. A case for microfilms which comprises a strip of transparent material folded upon itself to form two faces one of said faces being wider than the other, a fold in the portion of the wider face extending beyond the narrower face, said folded portion of the wider face being folded over the said narrower face to form a double fold therein, stitches extending through both thicknesses of said double fold in the wider face and both faces of the case and extending the entire length of the case so as to form a main compartment between the two faces of the case to receive the microfilm and an auxiliary compartment between the two faces of the case to receive a strip of material bearing identification signs, so that the film which is housed in the case can be identified and read without removal from the case.

2. A case for microfilms according to claim 1 wherein a reinforcing thread is inserted within the said first-mentioned fold in the extending portion of the wider face.

HENRI SOSTHÈNE LIBER.

REFERENCES CITED

The following references are of record in the file of this patent:

UNITED STATES PATENTS

| Number | Name | Date |
|---|---|---|
| 1,142,143 | Cauger | June 8, 1915 |
| 1,472,887 | Ringler | Nov. 6, 1923 |
| 1,487,296 | Underwood | Mar. 18, 1924 |
| 1,491,675 | Conklin | Apr. 22, 1924 |
| 1,801,546 | Enderle | Apr. 21, 1931 |
| 2,110,709 | Limbach | Mar. 8, 1938 |
| 2,154,510 | King et al. | Apr. 18, 1939 |
| 2,181,977 | Magovern | Dec. 5, 1939 |
| 2,206,561 | Engel | July 2, 1940 |
| 2,256,399 | MacHarg | Sept. 16, 1941 |
| 2,296,272 | De Sherbinen | Sept. 22, 1942 |
| 2,364,870 | Otto | Dec. 12, 1944 |